3,267,103
BIS AND TETRAKIS ESTERS OF 3,4,5-
TRIMETHOXYBENZOIC ACID
Otto Kraupp and Karl Schlögl, Vienna, Austria, assignors to Osterreichische Stickstoffwerke Aktiengesellschaft, Linz, Austria
No Drawing. Filed Mar. 14, 1963, Ser. No. 265,080
Claims priority, application Austria, Mar. 22, 1962, A 2,323/62; Mar. 30, 1962, A 2,577/62
8 Claims. (Cl. 260—268)

The present invention relates to new esters having the general formula

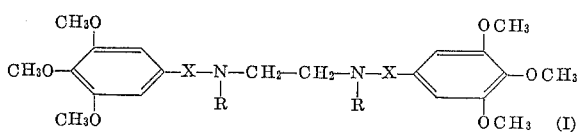

in which X represents a divalent radical with four carbon atoms in its principal chain and having the formula —COO—A— or CH$_2$—COO—B—, wherein A is an unsubstituted or lower-alkyl substituted trimethylene radical and B is an unsubstituted or lower-alkyl substituted ethylene radical, and R represents a methyl, ethyl or propyl radical or the radical

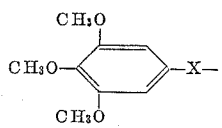

or both R's together represent an ethylene radical, and to the non-toxic salts of such esters. The essential feature of these esters is that in their molecule the two nitrogen atoms are separated by two carbon atoms and that each nitrogen atom is separated from the aromatic ring by four carbon atoms.

It has been found that the compounds of Formula I possess, in addition to an expected local anaesthetic and anti-histaminic action, surprisingly, an anti-fibrillant and coronary-dilatant action which is more intense and prolonged than that of previously known compounds. The strong coronary-dilatant effect has been observed in pharmacological studies using Langendorf's method. A study of the effects of the aforementioned compounds on the coronary circulation of dogs has also shown that these compounds effect an intensive and prolonged improvement of the oxygen supply (from measurements of the coronary flow and of the arterio-veinous oxygen differential) to the cardiac muscle. The compounds: N,N' - dimethyl - N,N'-bis - [3 - (3',4',5' - trimethoxybenzoxy) - propyl] - ethylene diamine-dihydrochloride, N,N'-diethyl-N,N'-bis-[3-3',4',5' - trimethoxybenzoxy) - propyl] - ethylene diamine dihydrobromide, N,N' - bis - [3 - (3',4',5' - trimethoxybenzoxy) - propyl] - piperazine dihydrochloride and N,N,N',N' - tetrakis - [3 - (3',4',5' - trimethoxybenzoxy) - propyl] - ethylene diamine dihydrochloride show a particularly strong and long-lasting effect.

In addition, the compounds of Formula I show a strong anti-fibrillant activity when tested for lowering of the electric fibrillation threshold in situ in the vestibules of cats. Further measurements concerning the action of the compounds of Formula I on the spinal fluid pressure in anaesthetized dogs indicate a dilatant effect on the cerebral blood vessels. In anaesthetized dogs, the dosage for the coronary-dilatant effect was 0.1 to 0.5 mg./kg. intravenously, that for the cerebrovascular effect was 0.3 to 1.0 mg./kg. intravenously and that for the anti-fibrillant effect from 1.0 mg./kg. upwards, intravenously.

In tests for surface-anaesthetic activity on the corneas of rabbits, the compounds of this invention have displayed pronounced local anaesthetic activity, the activity of some of them exceeding that of Procaine tenfold. When tested on isolated guinea pig ileum, the compounds displayed average spasmolytic, vagolytic and histaminolytic effects. The effects observed in the pharmacological tests were confirmed by clinical studies, carried out for example with N,N' - dimethyl - N,N' - [3 - (3',4',5'-trimethoxybenzoxy) - propyl] - ethylene diamine - dihydrochloride. By reason of these properties, the compounds of Formula I are primarily suitable for the treatment of cardiac ailments.

The compounds of Formula I may be prepared by combining two or four mols of 3,4,5-trimethoxybenzoic acid or of 3,4,5-trimethoxy-phenylacetic acid or their reactive derivatives in a single operation or stepwise in an esterification reaction with the group of the general formula

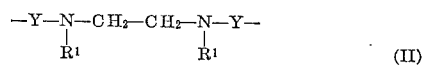

wherein Y has the same meaning as A in the case of preparation of a benzoic acid ester and the same meaning as B in the case of preparation of a phenylacetic acid ester, R$^1$ represents a methyl, ethyl or propyl radical or the radical Y or the two R$^1$'s represent together an ethylene radical, where A and B have the meaning indicated above, whereafter the di-tertiary bases thus obtained are converted, if desired, into salts by treatment with acids.

The preparation of the bis and tetrakis esters of Formula I is by conventional methods used for the preparation of esters. The preferred starting material for the introduction of the group of Formula II is a di-alcohol of the general formula;

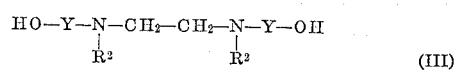

wherein R$^2$ represents a methyl, ethyl or propyl radical or the group —Y—OH or the two R$^2$'s together represent an ethylene radical and Y has the meaning given above. The dialcohol can for example be reacted with the free 3,4,5-trimethoxybenzoic acid or with the free 3,4,5-trimethoxy-phenylacetic acid in the presence of a usual esterification catalyst, such as for example sulphuric acid, p-toluenesulphonic acid or hydrochloric acid. It is also possible to react a lower alkyl ester of 3,4,5-trimethoxybenzoic acid or of 3,4,5-trimethoxy-phenylacetic acid with the alcohol of Formula III. Further, the anhydrides of the two acids can also be reacted with the dialcohols of Formula III and, lastly, the acid halides of the 3,4,5-trimethoxybenzoic acid or of the 3,4,5-trimethoxy-phenylacetic acid are outstandingly suitable for the preparation of the esters of Formula I, where it is possible to operate both in the presence of or without acid-binding agents.

In a preferred preparation, the reaction of the acid chloride of either of the two acids with the dialcohol of Formula III is effected in an anhydrous, inert organic solvent alone or in the presence of a tertiary amine acting as an acid-binding agent, or without a solvent in the presence of a tertiary amine alone. As inert solvents there may be mentioned acetone, dioxane, benzene and toluene.

The dialcohols of Formula III are not the only suitable starting materials containing the group of Formula II. There may also be used a dihalogen compound of the general formula

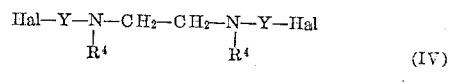

wherein R⁴ represents a methyl, ethyl or propyl radical or the group —Y—Hal or the two R⁴'s together represent an ethylene radical, Hal represents a halogen atom and Y has the meaning given above, which can be reacted with a salt, above all with a silver or alkali metal salt of the 3,4,5-trimethoxybenzoic acid or of the 3,4,5-trimethoxy-phenylacetic acid to obtain the esters of Formula I.

Furthermore, it is not absolutely necessary to employ a starting material already containing the group of Formula II when preparing the bis- or tetrakis-esters of Formula I. It is equally possible to form this group during the reaction with the trimethoxybenzoic acid or the trimethoxy-phenylacetic acid or their derivatives. It is thus possible, according to a very advantageous variant of the process of the invention, to react either of the two acid chlorides with a halo alcohol of the general formula:

$$HO-Y-Hal \qquad (V)$$

in which Y and Hal have the meanings given above, to obtain halogenated esters of the general formula:

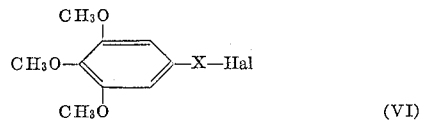

(VI)

wherein X and Hal have the meanings given above and to react two or four mols of these halogenated esters with one mol of a diamine of the general formula:

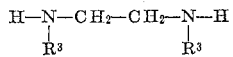

in which $R^3$ represents a methyl, ethyl or propyl radical or a hydrogen atom or the two $R^3$'s together represent an ethylene radical.

The reaction of the halogenated ester of Formula VI with the diamine of Formula VII is effected particularly advantageously by heating in dimethyl formamide as solvent, where condensing agents such as sodium hydride or sodium amide may be present, although their presence is not absolutely necessary. According to another variant of the process, the diamines of Formula VII may themselves act as acid-binding agents, an excess of these substances being used in this case. In the process according to the invention, the compounds of Formula I may be obtained either as free bases or as salts. Where the compounds are isolated in the form of free bases, the latter can be subsequently converted into salts, which constitute the preferred form for clinical applications.

As the acid component in such salts all non-toxic acids which do not cause harmful side effects in man are suitable. Particular examples are the iodides, bromides and chlorides, the hydrogen sulphates and the methosulphates as well as the toluene-sulphonates and the perchlorates.

The preparation of the dialcohols of Formula III used as starting materials can be effected in various ways. They can for example be prepared by reacting the corresponding ω-haloalkanols with the corresponding diamines, N-alkylated diamines or piperazine or by the reaction of α,β-unsaturated carboxylic acid esters with diamines, N-alkylated diamines or piperazine and subsequent reduction with lithium aluminum hydride or sodium alcoholate. The most advantageous mode of preparation of the N,N'-bis-(hydroxyethyl)-ethylenediamines is the reaction of the diamine with ethylene oxide. The dihalogen compounds of Formula IV can be obtained by replacing the alcohol groups of the dialcohols of Formula III by halogen atoms with the aid of the usual halogenating agents, such as thionyl chloride.

The following examples illustrate the invention. Unless otherwise stated, the parts indicated in the examples are parts by weight.

Example 1

To a solution of 13 parts of N,N'-dimethyl-N,N'-bis-(3-hydroxypropyl)-ethylene diamine and 12 parts by volume of absolute pyridine in 80 parts by volume of absolute dioxane there are added dropwise and under constant stirring 35 parts of 3,4,5-trimethoxybenzoyl chloride dissolved in 70 parts by volume of absolute dioxane in the course of 30 minutes. The mixture is stirred for a further 3 hours at a temperature of 100° C. and the excess solvent is then evaporated in vacuo. The residue of the evaporation is treated with ethyl acetate and saturated sodium carbonate solution, whereafter the organic phase is separated, treated with water, dried with sodium sulphate and the solvent is removed in vacuo. The residue thus obtained is taken up in ether and separated from 4 parts of insoluble trimethoxybenzoic acid anhydride by filtration. After evaporation of the ether there are obtained 32.5 parts of N,N'-dimethyl-N,N'-bis - [3 - (3,4,5-trimethoxybenzoxy)-propyl]-ethylene diamine, corresponding to a yield of 86% of the theoretical. Melting point: 75° to 77° C.

The di-tertiary base thus obtained is dissolved in ether and the solution is saturated with hydrogen chloride gas. After isolation and reprecipitation from methanol-ether there is obtained the dihydrochloride melting at 170° to 174° C.

The following salts can be prepared by reacting the N,N'-dimethyl-N,N'-bis-[3-(3',4',5'-trimethoxybenzoxy)-propyl]-ethylene diamine with the appropriate acid:

| | Melting point, ° C. |
|---|---|
| Dihydrobromide | 196 to 200 |
| Dihydrobromide-hydrate | 50 to 60 |
| Dihydroiodide-hydrate | 60 to 65 |
| Sulphate | 80 to 90 |
| Di-perchlorate | 176 to 181 |
| Dimethosulphate | 144 to 147 |
| Diiodomethylate | 220 to 223 |
| Di-p-toluene-sulphonate | 80 to 84 |

There can be prepared in a similar manner:

From N,N'-dipropyl-N,N'-bis-(3-hydroxypropyl)-ethylenediamine and 3,4,5-trimethoxybenzoyl chloride: The N,N' - dipropyl - N,N'-bis-[3-(3',4',5'-trimethoxybenzoxy)-propyl]-ethylene diamine-dihydrobromide, melting at 200° to 205° C.

From N,N'-diethyl-N,N'-bis-(3-hydroxypropyl)-ethylene diamine and 3,4,5-trimethoxybenzoyl chloride: The N,N' - diethyl - N,N'-bis-[3-(3',4',5'-trimethoxybenzoxy)-propyl]-ethylene diamine-dihydrobromide, melting at 76° to 79° C.

From N,N'-bis-(3-hydroxy-propyl)-piperazine and 3,4,5-trimethoxy-benzoyl chloride: The N,N'-bis-[3-(3',4',5'-trimethoxybenzoxy)-propyl]-piperazine, the hydrochloride of which has a melting point of 216° to 220° C.

From N,N'-dimethyl-N,N'-bis-(2-methyl-3-hydroxy-propyl)-ethylene - diamine and 3,4,5 - trimethoxybenzoyl chloride, after conversion into the dihydrochloride: The N,N'-dimethyl - N,N'-bis-[2-methyl-3-(3',4',5'-trimethoxybenzoxy)-propyl]-ethylene diamine dihydrochloride, melting at 200° to 203° C.

The N,N'-dimethyl - N,N'-bis-(3'-hydroxypropyl)-ethylene diamine used as starting material is prepared by reacting N,N'-dimethylethylene diamine with acrylic acid methyl ester and subsequent reduction with lithium aluminum hydride.

There can be prepared in an analogous manner the N,N'-dipropyl - N,N'-bis-(3-hydroxypropyl)-ethylene diamine boiling at 140° to 150° C./0.3 mm. Hg; the N,N'-diethyl-N,N'-bis-(3-hydroxypropyl)-ethylene diamine boiling at 125° to 130° C./0.5 mm. Hg; the N,N'-dimethyl-N,N'-bis-(2 - methyl-3-hydroxypropyl)-ethylene diamine boiling at 90° to 110° C./0.1 mm. Hg and the N,N'-bis-(3-hydroxy-n-propyl)-piperazine melting at 143° to 144° C.

Example 2

A mixture consisting of 8 parts of 3,4,5-trimethoxybenzoyl chloride and 3.3 parts of 3-chloropropanol is slowly heated to 100° C. At 60° C. the mixture becomes homogeneous and hydrogen chloride begins to evolve. After heating for a total of 3 hours to 100° C., the change is diluted with 50 parts by volume of ether, washed three times with saturated sodium bicarbonate solution, dried over sodium sulphate, whereafter the ether is evaporated in vacuo. The residue of the evaporation can be recrystallised from ether-petrol-ether. There are obtained in this manner 8.3 parts of 3,4,5-trimethoxybenzoic acid-(3'-chloropropyl)-ester melting at 57° to 59° C., corresponding to a yield of 82% of the theoretical.

28.8 parts of 3,4,5-trimethoxybenzoic acid-(3'-chloropropyl)-ester and 11 parts of N,N'-diethyl-ethylene diamine are heated on the water bath for 24 hours in 100 parts by volume of dimethyl formamide. At the end of the reaction, the dimethyl formamide is driven off in vacuum and the residue is taken up in ethyl acetate and water. The ethyl-acetate phase is separated, washed twice with water, whereupon the amine is withdrawn from this phase by shaking it twice with 3 N-hydrochloric acid. After rendering the acid solution alkaline with potassium carbonate, the amine is taken up in ether, the solution is washed with water, dried and evaporated. There is obtained as the residue 17 parts of N,N'-diethyl-N,N'-bis-[3 - (3',4',5'-trimethoxybenzoxy) - propyl] - ethylene diamine, corresponding to a yield of 55% of the theoretical.

The base can be converted into its dihydrobromide by saturation of its ethereal solution with hydrogen bromide gas. The dihydrobromide melts at 76° to 79° C.

By reacting 28.8 parts of 3,4,5-trimethoxybenzoic acid-(3'-chloropropyl)-ester with 19.4 parts of piperazine hexahydrate, there can be obtained in an analogous manner 18.3 parts of N,N'-bis-[3-(3',4',5'-trimethoxybenzoxy)-propyl]-piperazine, corresponding to 62% of the theoretical yield The following salts can be prepared by reaction with the appropriate acids:

| Salt | Melting point, ° C. |
| --- | --- |
| Dihydrochloride | 216 to 220 |
| Dihydrobromide | 222 to 227 |
| Dihydroiodide | 235 to 239 |
| Sulphate | 92 to 95 |
| Di-perchlorate | 248 to 252 |
| Dimethosulphate | 192 to 196 |
| Diiodomethylate | 158 to 160 |
| Di-p-toluene-sulphonate | 197 to 200 |
| Di-cyclohexylsulphamate | 105 to 109 |

There can be obtained in the same manner:

The 3,4,5-trimethoxybenzoic acid-(3'-bromopropyl)-ester, melting at 63° to 66° C.

The 3,4,5-trimethoxybenzoic acid-(3'-iodopropyl)-ester, melting at 53° to 57° C.

The haloalkyl-esters can be reacted in the above described manner with the N,N'-lower-dialkyl-polymethylenediamines to obtain the corresponding N,N'-lower-dialkyl-N,N'-bis-[3-(3',4',5'-trimethoxy - benzoxy)-propyl]-polymethylene-diamines. The same reaction with piperazine leads to the N,N'-bis-[3-(3',4',5'-trimethoxy-benzoxy)-propyl]-piperazine.

Example 3

8.8 parts of N,N'-dimethyl-N,N'-bis-(3-hydroxypropyl)-ethylene diamine are heated for 3 hours in absolute dioxane with 40.8 parts of 3,4,5-trimethoxybenzoic acid anhydride. At the end of the reaction the solvent is driven off in vacuum, the residue is taken up in ethyl acetate and washed with concentrated aqueous sodium carbonate solution. After evaporation of the ethyl acetate solution, there are obtained 16.35 parts of N,N'-dimethyl-N,N'-bis - [3-(3',4',5'-trimethoxybenzoxy)-propyl]-ethylene diamine.

Example 4

2.9 parts of N,N,N',N'-tetrakis-(3-hydroxypropyl)-ethylene diamine are mixed with 50 parts by volume of absolute dioxane and 3.5 parts by volume of absolute pyridine and added slowly dropwise to a solution of 9.5 parts 3,4,5-trimethoxybenzoyl chloride in 60 parts by volume of dioxane. After heating for three hours, the mixture is processed as described in Example 1. There are obtained 6.1 parts of amorphous N,N,N',N'-tetrakis-[3-(3',4',5'-trimethoxybenzoxy) - propyl]-ethylene diamine, corresponding to 57% of the theoretical yield.

The N,N,N',N'-tetrakis-(3-hydroxypropyl)-ethylene diamine is obtained in a manner similar to that described in Example 1 by reacting ethylene diamine with acrylic acid methyl ester in a molar ratio of 1:4 and subsequent reduction with lithium aluminum hydride in absolute tetrahydrofuran.

Example 5

A suspension of 3.14 parts of N,N'-dimethyl-N,N'-(3-chloropropyl)-ethylene diamine-dihydrochloride in 50 parts by volume of anhydrous dimethyl formamide is mixed with a suspension of 11 parts of the anhydrous potassium salt of 3,4,5-trimethoxybenzoic acid (prepared by neutralising the acid in methanolic solution with an equivalent amount of 3 N potassium hydroxide, evaporating the solution in vacuum and drying for several hours at 60° C. in vacuum) in 100 parts by volume of dimethyl formamide, whereafter the mixture is heated for three hours to 70° to 80° C. under stirring. The excess solvent is subsequently removed in a rotary evaporator at a pressure of 10 mm. Hg and the residue is treated with about 100 parts by volume of a saturated aqueous sodium bicarbonate solution. The emulsion is exhaustively shaken with ether, the ethereal solution is washed with water, dried and evaporated. The oily residue of evaporation (2.1 parts) can be crystallised by treatment with ether-petrol-ether, whereby there are obtained 1.77 parts of N,N'-dimethyl - N,N' - bis - [3 - (3',4',5'-trimethoxybenzoxy)-propyl]-ethylene diamine melting at 74° to 76° C.

Similarly, instead of the potassium salt, the silver salt of 3,4,5-trimethoxybenzoic acid can be reacted with the N,N'-dimethyl-N,N'-bis-(3 - hydroxypropyl)-ethylene diamine. In this case, 14 parts of the silver salt are employed while the amounts of the other reactants remain the same. There are thus obtained 2.0 parts of N,N'-dimethyl - N,N'-bis - [3 - (3',4',5'-trimethoxybenzoxy)propyl]-ethylene diamine melting at 73° to 76° C.

N,N'-dimethyl - N,N'-bis - (3 - chloropropyl)-ethylene diamine-dihydrochloride is obtained by reacting N,N'-dimethyl-N,N'-bis-(3-hydroxypropyl)-ethylene diamine with thionyl chloride in chloroform.

Example 6

To a solution of 1.76 parts of N,N'-dimethyl-N,N'-bis-(2-hydroxy-ethyl)-ethylene diamine in 30 parts by volume of anhydrous dioxane there are added dropwise under stirring a solution of 4.9 parts of 3,4,5-trimethoxyphenyl-acetic acid chloride in 20 parts by volume of dioxane in the course of 20 minutes. The solution is then stirred for one and a half hours at 80° C. and, after separation of the hydrochloride on cooling, is mixed with 100 parts by volume of ether and saturated with hydrogen chloride gas. The N,N'-dimethyl-N,N'-bis-[2-(3',4',5'-trimethoxyphenacetoxy)-ethyl]-ethylene diamine - dihydrochloride thus obtained is separated, washed with ether and reprecipitated from ethanol ether. There are obtained in this manner 2.66 parts of pure product melting at 152° to 160° C., corresponding to 40% of the theoretical yield.

The N,N'-dimethyl-N,N'-bis-(2 - hydroxy-ethyl)-ethylene diamine used as starting material can be prepared by reacting N,N'-dimethylethylene diamine with ethylene oxide. It has a boiling point of 150° to 170° C./0.4 mm. Hg.

We claim:
1. The new esters selected from the group consisting of compounds of the formulae:

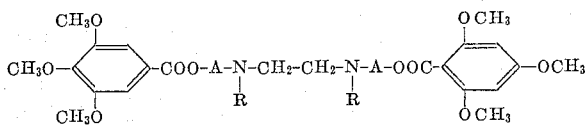

and

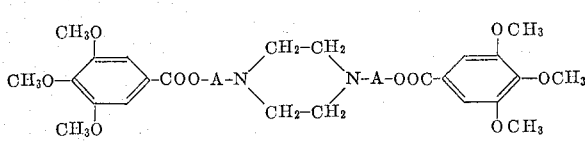

wherein A is selected from the group consisting of trimethylene and trimethylene substituted by lower alkyl, and R is selected from the group consisting of methyl, ethyl, propyl and the group

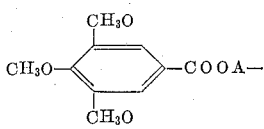

wherein A has the same meaning as above and the non-toxic salts thereof.

2. The non-toxic salts of N,N'-dimethyl-N,N'-bis-[3-(3',4',5' - trimethoxybenzoxy)propyl] - ethylene - diamine.

3. The non-toxic salts of N,N'-bis-[3-(3',4',5'-trimethoxybenzoxy)-propyl]-piperazine.

4. N,N'-dimethyl-N,N'-bis-[3-(3',4',5'-trimethoxybenzoxy)-propyl]-ethylene-diamine-dihydrochloride.

5. N,N'-bis - [3-(3',4',5'-trimethoxybenzoxy)-propyl]-piperazine-dihydrochloride.

6. N,N,N',N'-tetrakis - [3 - (3',4',5' - trimethoxybenzoxy)-propyl]-ethylene-diamine-dihydrochloride.

7. N,N'-diethyl - N,N'-bis - [3-(3',4',5'-trimethoxybenzoxy)-propyl]-ethylene-diamine-dihydrobromide.

8. N,N'-dimethyl - N,N'-bis-[2 - methyl-3-(3',4',5'-trimethoxybenzoxy)-propyl] - ethylene - diamine - dihydrochloride.

References Cited by the Examiner
UNITED STATES PATENTS

| | | | |
|---|---|---|---|
| 2,286,390 | 6/1942 | Sparks | 260—268 |
| 2,753,350 | 7/1956 | Hasselstrom | 260—268 |
| 2,995,554 | 8/1961 | Biel | 260—268 |
| 2,996,506 | 8/1961 | Gold-Aubert | 260—268 |
| 3,012,053 | 12/1961 | Lesslie | 260—268 X |

OTHER REFERENCES

Gold-Aubert et al., Helvetica Chimica Acta, vol. 42, pp. 1156–1159 (1959).

LORRAINE A. WEINBERGER, *Primary Examiner.*

N. S. RIZZO, *Examiner.*

N. H. STEPNO, S. B. WILLIAMS,
*Assistant Examiners.*